United States Patent
Viet

[19]

[11] Patent Number: 6,158,236
[45] Date of Patent: Dec. 12, 2000

[54] REFRIGERATION CAPACITY ACCUMULATOR

[76] Inventor: Thai Nguyen Viet, 7, Chemin du Hallot, 27630 Ecos, France

[21] Appl. No.: 09/155,423
[22] PCT Filed: Apr. 1, 1997
[86] PCT No.: PCT/FR97/00580
  § 371 Date: Sep. 25, 1998
  § 102(e) Date: Sep. 25, 1998
[87] PCT Pub. No.: WO97/37176
  PCT Pub. Date: Oct. 9, 1997

[30] Foreign Application Priority Data

Mar. 29, 1996 [FR] France .................................. 96.03926

[51] Int. Cl.⁷ ..................................................... F25D 17/02
[52] U.S. Cl. ................................................................. 62/434
[58] Field of Search ........................................ 62/430, 434

[56] References Cited

U.S. PATENT DOCUMENTS

| | | | |
|---|---|---|---|
| 4,283,925 | 8/1981 | Wildfeuer | 62/434 |
| 5,036,904 | 8/1991 | Kanda et al. | 165/10 |
| 5,441,097 | 8/1995 | Kanda et al. | 165/10 |
| 5,765,389 | 6/1998 | Salyer | 62/434 |
| 5,871,041 | 2/1999 | Rafalovich et al. | 165/10 |

FOREIGN PATENT DOCUMENTS 404055673  2/1992  Japan ...................................... 62/434

*Primary Examiner*—William Doerrler
*Assistant Examiner*—Melvin Jones
*Attorney, Agent, or Firm*—William H. Holt

[57] ABSTRACT

A refrigeration capacity accumulator including a set of parallel transversely spaced tubes arranged in layers. Each tube is closed at both ends and contains a static liquid that solidifies into ice when the tube is exposed to a below-zero temperature. Each tube compensates for the expansion of the static liquid during solidification. Specifically, the tube is arranged in a horizontal position, an expansion space is provided in the gap between the static liquid and the cylindrical wall of the tube, and two internally hemispherical end walls are provided. According to the method, the accumulator is operated and a zigzagging flow of a dynamic fluid is fed through the spaces between and around the tubes. The accumulator may be connected to a refrigeration unit and/or an operating apparatus.

14 Claims, 2 Drawing Sheets

REFRIGERATION CAPACITY ACCUMULATOR

The present invention relates to a refrigeration capacity accumulator and a method using this accumulator and comprised of accumulating a refrigeration capacity and rendering this refrigeration capacity.

There are known refrigeration accumulation systems that are constituted by accumulators with banks of multiple tubes wherein the tubes are immersed in tanks of clear water. The use of accumulators of this type requires the utilization of a minimum of two dynamic liquids: a primary liquid circulating inside the tubes and a secondary liquid circulating outside and around the tubes.

In the accumulator's "Charge" mode, the primary liquid is circulated at a negative temperature, from a refrigeration unit into the tubes of the banks so as to create, with the secondary liquid circulating outside the tubes, a layer of ice around these tubes.

In the "Discharge" mode, the refrigeration unit is shut off and the melting of the layer of ice created around the tubes cools the secondary liquid, which is directed by a pumping station to the utilization points.

This widely used technology has the drawback of making it necessary to discharge the accumulator completely, that is, to make all of the ice generated around the tubes melt, between each "Charge-Discharge" cycle. Actually, a residual layer of ice, even a slight one, in the case of an incomplete melting, constitutes a veritable isothermal shield, which interferes with the heat exchange between the primary and secondary fluids. For this reason, the heat transfer cannot be adequately obtained, and a new ice producing phase cannot begin. In most cases, it is impossible to predict the thermal requirements in advance with precision; however, the melting of the ice must be complete in order not to cause irreversible damage to the refrigeration units.

The erratic performance of these devices makes it necessary to add a third cooling circuit in order to maintain a certain constant in the process. Actually, as the ice melts, the cross section of the tubes of the banks, the "tube+ice" diameter, decreases and affects the results. The head loss and the heat transfer surfaces of the secondary fluid flowing over the bank vary considerably between the beginning and the end of the cooling cycle.

Moreover, the secondary fluid must be oxygenated continuously in the "Charge" mode, in order to allow a homogeneous and even formation of the ice around the tubes.

The mandatory use of two dynamic liquids, primary and secondary, as well as a third supplementary circuit in order to maintain a certain constant in the process, and a fourth circuit for oxygenating the secondary liquid, imposes an awkward implementation as well as complex technologies for controlling the operation of the system.

From the investment point of view, these necessary technologies can often cancel out the savings inherent in refrigeration accumulation by means of ice storage.

Moreover, these known systems cannot be used directly with a secondary liquid under pressure, because of the oxygenation required during the ice producing phase.

The object of the present invention is not only to eliminate the drawbacks of these known systems, but also to obtain a substantial improvement in capacity (greater ice mass per cubic meter of space required) and in performance (square meters of heat transfer surface), as well as an extreme simplification of the implementation.

To this end, the first subject of the invention is a refrigeration capacity accumulator of the type comprising a set of accumulation tubes disposed in an isothermal enclosure, these tubes being spaced apart and maintained substantially parallel to one another, each tube of this set being closed at its ends and containing a primary static liquid capable of transforming into ice during a cooling by a secondary refrigeration fluid and/or of cooling a secondary, so-called utilization liquid, the secondary fluid and/or liquid circulating between the tubes, outside the latter, the circulation in the enclosure of the secondary product or the two secondary products occurring between an inlet and an outlet located at two opposite ends of this enclosure, the accumulator being characterized in that (a) each tube is closed at both of its ends by an internally concave wall, (b) each tube maintains an expansion space between the primary liquid and its cylindrical wall, and (c) each tube is disposed horizontally within the enclosure.

According to a first particularly advantageous embodiment, each end wall of an accumulation tube is hemispherical.

According to another advantageous embodiment, the accumulation tubes are disposed within the enclosure at right angles to the direction of circulation of the secondary product or the two secondary products.

In a preferred embodiment, the accumulation tubes are disposed so as to form superposed, spaced layers, the tubes being offset transversely from one layer to the next so as to force the secondary product to circulate through the spaces by zigzagging around the tubes and from one layer to the next.

The primary static liquid contained in each tube can for example be either water, or water dosed with NaCl salts, or another eutectic solution.

According to yet another advantageous embodiment, the wall of each tube is metallic.

According to another variant, the isothermal enclosure can be closed in such a way that the secondary refrigeration fluid used can be a gas.

The second subject of the present invention is an accumulation tube enclosing a primary static liquid capable of transforming into ice under the effect of a secondary refrigeration fluid circulating around this tube, and/or of cooling a secondary, so-called utilization liquid circulating around this tube, this tube being intended to equip a refrigeration capacity accumulator having at least one of the above-mentioned characteristics and being characterized in that it is metallic, in that it is closed at both of its ends by an internally concave wall, and in that it leaves an expansion space open between the primary liquid and its cylindrical wall.

It is known from the patents U.S. Pat. No. 4,388,963 and U.S. Pat. No. 4,856,296 to produce heat storage installations and cold storage installations, particularly for air-conditioning purposes, which use batteries of tubes closed at both of their ends by a substantially concave internal wall, each of which tubes encloses a liquid such as water, which may be hot or cold depending on the purpose of the installations, or even ice.

However, each tube of this type is made of plastic, a material which is known to have a heat transfer coefficient expressed in Kcal/m/° K. on the order of 200 times lower than that of metals, particularly steel.

The tubes known from the two above-mentioned documents of the prior art are therefore not capable of fulfilling the same role as the tube which is the subject of the present invention, namely that of allowing the primary static liquid that this tube contains to transform as quickly as possible from the liquid state to the solid state in the "charge" mode, and vice versa in the "discharge" mode, so as to provide a very high capacity for cooling the secondary liquid outside the tube according to the invention, even in the case of peaks in need of cold.

To achieve an objective of this type, it is eminently preferable for the material of which each tube is made to promote thermal exchange, which is not the case with plastic materials.

Preferably, each of the tubes according to the invention has a diameter of about 10 centimeters and a length between about 1 meter and about 6 meters, hence a length/diameter ratio equal to at least 10.

Tubes of this type, which specifically have an elongated overall appearance, have the advantage of further promoting thermal exchange, since at equal internal volumes, a long thin tube obviously offers a lateral internal/external heat transfer surface greater than that of a short thick tube (it is noted in this respect that $V=K \cdot S^2/L$, V in this case being the internal volume of the tube, S its lateral heat transfer surface, L its length and K a constant equal to $\frac{1}{4}\pi$).

In addition, the finer, longer and thinner the tube, the faster the primary static liquid it contains will be transformed from a liquid to a solid, and vice versa, as compared to the same liquid enclosed in a short thick tube, under identical conditions in terms of the temperature and the circulation of external secondary fluid.

In this sense, the tube according to the invention is clearly distinguished from the tube known from the patent U.S. Pat. No. 4,856,296, which has a length/diameter ratio on the order of only about 2.

Furthermore, the tube according to the invention is closed at both of its ends by an internally concave, and advantageously hemispherical, wall, this shape being the best for preventing fractures of the metal at the level of the welds produced at each of the joints between the center cylindrical part of the tube and an end of internally concave shape.

In this sense, the tube according to the invention is clearly distinguished from the tube known from the patent U.S. Pat. No. 4,388,963.

The third subject of the present invention is a method for accumulating a refrigeration capacity and rendering this refrigeration capacity using the accumulator having at least one of the above-mentioned characteristics, this method being characterized in that it is comprised of circulating a secondary refrigeration fluid between the horizontally disposed tubes, outside the latter, in order to cool the primary static liquid contained in each tube and/or of circulating a secondary, so-called utilization liquid between these horizontally disposed tubes, outside the latter, in order to cool this secondary utilization liquid under the effect of the primary static liquid.

Advantageously, according to this method, the circulation between the tubes of the secondary refrigeration fluid and/or the secondary utilization liquid takes place at right angles to the general direction in which these tubes run.

In another particularly advantageous implementation of this method, the secondary refrigeration fluid and the secondary utilization liquid circulating between the tubes are one and the same fluid, and a distributor regulates the circulation of this single fluid in the "charge" mode, in the "discharge" mode, or in the "mixed" mode.

Other characteristics and advantages of the invention will emerge in the course of the following specification, given in reference to the appended drawings which, by way of non-limiting examples, illustrate a plurality of embodiments.

Figure 1:
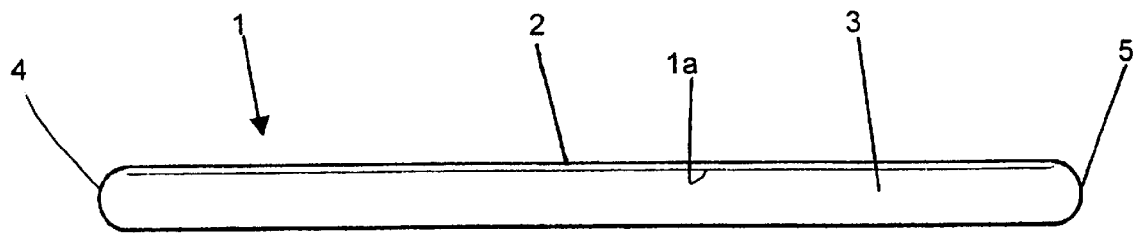
FIG. 1 is a schematic view in axial section of an accumulation tube which is part of the accumulator according to the invention.

Each accumulation tube 1 of the accumulator A according to the invention illustrated in FIG. 1 comprises a wall 2 which is for example metallic, containing a static liquid 3, for example water or water dosed with NaCl salts or any other eutectic solution, capable of solidifying when the accumulation tube 1 is exposed to a refrigeration fluid at a negative temperature.

The accumulation tube 1 is cylindrical and it is closed at each end 4, 5 by an internally concave wall which is for example hemispherical. An expansion space (1*a*) is maintained between the static liquid 3 and the cylindrical wall of the accumulation tube 1. With a horizontal disposition of the accumulation tube 1, this expansion space 1*a* and these internally concave walls 4, 5 (for example hemispherical) constitute a means for compensating the expansion effect of the static liquid 3 during solidification.

Figure 2:
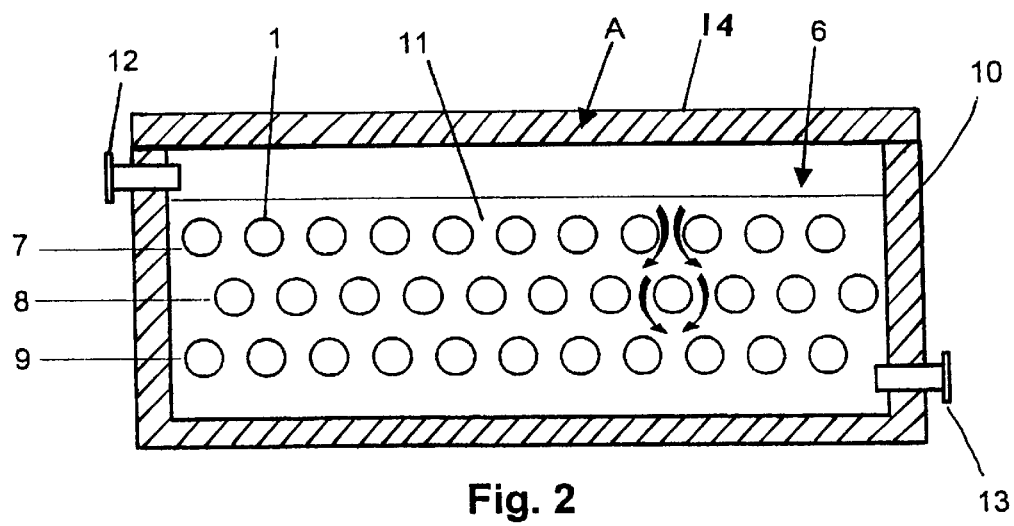
FIG. 2 is a schematic sectional view of the accumulator according to the invention using a set of accumulation tubes of the type illustrated in FIG. 1, these tubes being seen in elevation.
Figure 3:
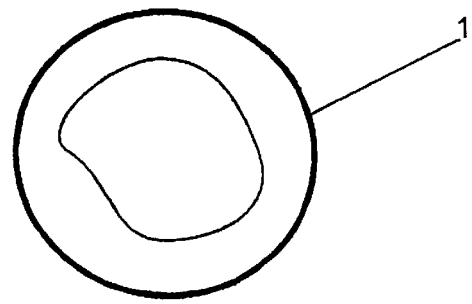
FIG. 3 is a cross-sectional view in larger scale of the accumulation tube of FIG. 1 during the melting of the solidified liquid.

The accumulator A according to the invention, illustrated in FIG. 2, comprises a compact set (6) of accumulation tubes 1 maintained apart from one another transversely in substantially parallel fashion, thus forming layers of tubes 7, 8 and 9. These layers are in turn assembled in such a way that the tubes are offset from one another from one layer to the next, as illustrated. The tubes 1 run perpendicular to the plane of the drawing.

This set 6 of accumulation tubes 1 is installed in an isothermal enclosure 10 containing a refrigeration fluid 11 at a negative temperature in which the tubes are immersed. An inlet 12 and an outlet 13, respectively, are provided at the top and the bottom of the enclosure 10 in order to circulate this refrigeration fluid 11 from the inlet 12 to the outlet 13, through the spaces between the accumulation tubes 1 of the set 6 and around these tubes 1, which are held in the enclosure by suitable means. It is understood that if the fluid 11 is a gas, the enclosure must be closed by a lid 14. When this fluid 11 is a liquid such as water, it is understood to have an antifreeze agent added. The disposition of the tubes illustrated in FIG. 2 forces the fluid 11 to zigzag through the layers of tubes 1, as indicated by the arrows, in direct contact with these tubes 1, which notably improves the thermal exchange.

The accumulator A described above operates in the following way.

In the "charge" mode, the inlet 12 and the outlet 13 are connected to a refrigeration unit, and the fluid 11 is circulated inside the enclosure at a negative temperature. The static liquid 3 cools, passes from the liquid state to the solid state, and is transformed into ice, beginning at the periphery all the way to the core of the tube. The accumulator A is then ready to cool a utilization liquid that is circulated through the spaces between the tubes 1 and around the tubes, the cooling of the utilization fluid being obtained as a result of the latent heat of the melting of the ice.

In the "discharge" mode, the inlet 12 and the outlet 13 are connected to a utilization installation of the external fluid 11, in order to cool this installation. The melting of the ice inside the accumulation tubes 1 supplies the refrigeration capacity required for this purpose. This melting begins at the periphery of the accumulation tube and spreads toward the center.

In the "mixed" mode, the inlet 12 and the outlet 13 are simultaneously connected to the refrigeration unit and the external utilization installation. The refrigeration output is added to the "discharge" of the set of tubes, which considerably increases the total available cooling capacity. This functioning in the simultaneous fashion is only possible as a result of the fact that the melting and the solidification inside the accumulation tube occurs in parallel fashion, that is, from the outside of the tube toward the inside, to the core of the tube.

Figure 4:
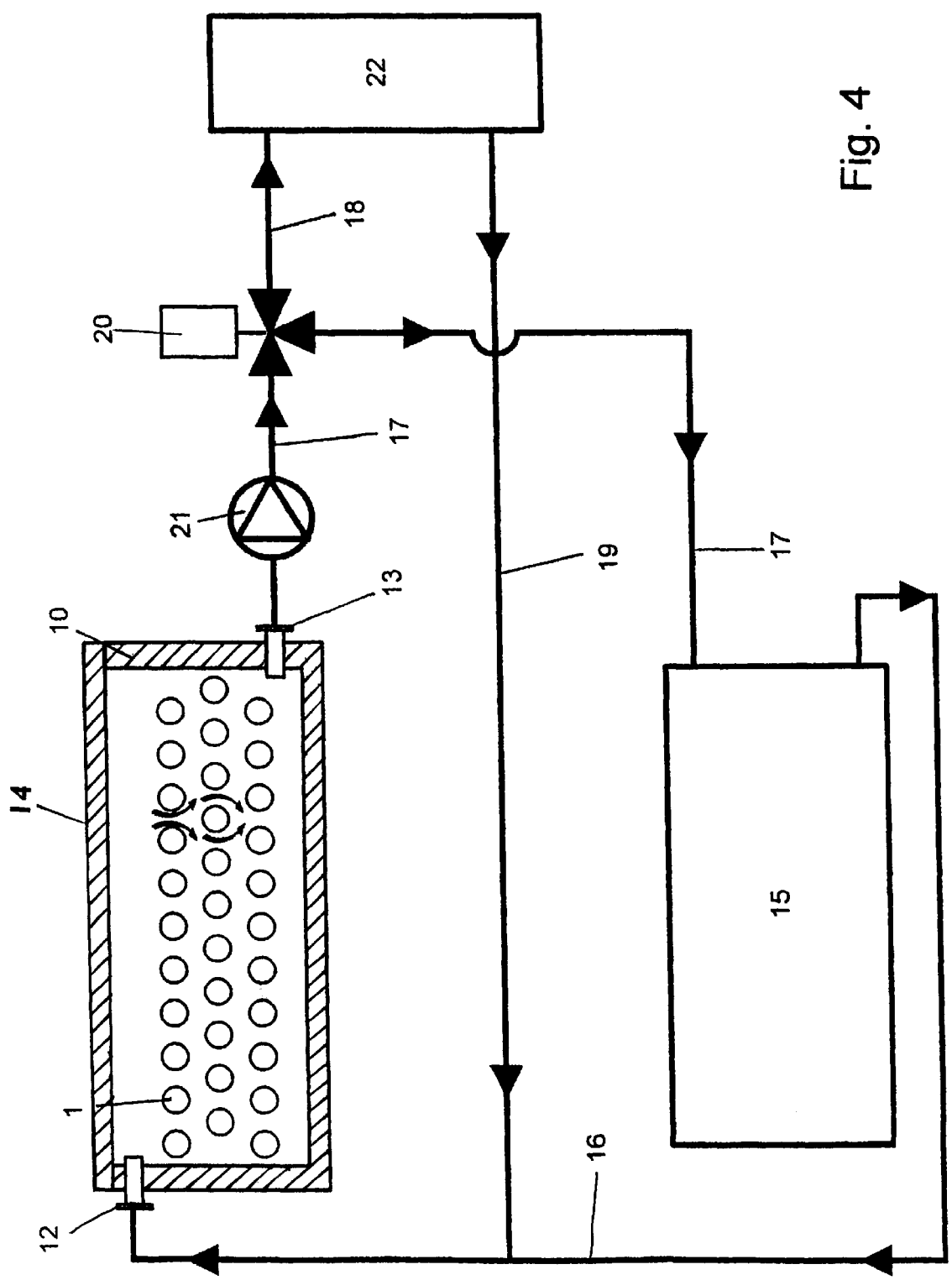
FIG. 4 is a flow diagram of a system for cooling a fluid by means of an accumulator according to the invention with the ability to operate in the "charge," "discharge," or "mixed" mode.

The diagram of FIG. 4 clearly illustrates such a functioning in the "mixed" mode.

The system illustrated in FIG. 4 comprises the accumulator A according to the invention connected, on the one hand, to a refrigeration unit 15 by the conduits 16 and 17 and on the other hand to one or more external utilization installations 22, by the conduits 17–18 and 19–16. A distributor 20 regulates the circulation in the various conduits and a pump 21 makes it possible to propel the fluid 11 in the various conduits.

It is understood that because of the distributor 20, it is possible to operate the entire system in the "charge" mode only, in the "discharge" mode only, or in both at the same time, that is, in the "mixed" mode. These three modes of functioning are indicated by the arrows in the diagram of FIG. 4.

The invention offers a number of advantages.

The static liquid 3 in the method of the invention is isolated by the closed tubes from the refrigeration fluid in the "charge" mode, and from the fluid to be cooled in the "discharge" mode. Consequently, the performance of the accumulator is constant until the ice inside the tubes has melted completely, the quality of the thermal exchange remaining constant as long as there is ice in these tubes.

The melting of the solidified liquid takes place from the outside of the tubes toward the inside, and the solidification of this liquid takes place in the same direction. For this reason, it is entirely possible to "charge" the accumulator simply and homogeneously at any time, even during a "discharge" cycle, by using the refrigeration unit in the simultaneous fashion. This represents a very high cooling capacity that is available to the user at any time for eliminating the peaks in need of cold.

The slender shape and round cross-section of the tubes provides the greatest mass of solidifying liquid for a given volume attributed to the accumulator. For example, these tubes can have a diameter of about 10 centimeters and a length between about 1 meter to 6 meters or more.

The shape of the tubes and their disposition provides the best thermal exchange between the tubes and the surrounding fluid, while creating a constant, minimal head loss in this fluid circulating outside the tubes.

The fact that the tubes are closed, without any need to be connected to a network, notably facilitates the analysis and the production of an accumulation refrigeration system. The refrigeration capacity requirements simply determine the number and the length of the tubes to be installed. The production and assembly of the tubes are very simple and allow for any imaginable configuration.

The operation of an accumulator according to the invention and its connection to a utilization installation of the fluid 11 is very simple, since only one circuit is necessary, the method working with only one dynamic fluid.

This fluid 11 can be in the form of a liquid containing an antifreeze agent.

The invention is open to many variants without going beyond the scope of the invention.

What is claimed is:

1. A refrigeration capacity accumulator of the type comprising a set (6) of accumulation tubes (1) disposed in an isothermal enclosure (10), said tubes (1) being spaced apart and maintained substantially parallel to one another, each tube (1) of said set being closed at its ends (4, 5) and containing a primary static liquid (3) capable of transforming into ice during a cooling by a secondary refrigeration fluid (11) and/or of cooling a secondary, so-called utilization liquid (11), the secondary fluid and/or liquid circulating between the tubes (6), outside the latter, the circulation in the enclosure (10) of the secondary product (11) or the two secondary products (11) occurring between an inlet (12) and an outlet (13) located at two opposite ends of said enclosure, characterized in that (a) each tube is closed at each of its two ends (4, 5) by an internally concave wall, (b) each tube maintains an expansion space (1a) between the primary liquid (3) and its cylindrical wall (2), and (c) each tube is disposed horizontally within the enclosure (10).

2. The accumulator according to claim 1, characterized in that each end wall (4, 5) of an accumulation tube (1) is hemispherical.

3. The accumulator according to claim 1, characterized in that the accumulation tubes (1) are disposed within the enclosure (10) at right angles to the direction of circulation of the secondary product or the two secondary products (11).

4. The accumulator according to claim 1, characterized in that the accumulation tubes (1) are disposed so as to form superposed, spaced layers (7, 8, 9), the tubes being offset transversely from one layer to the next so as to force the secondary product (11) to circulate through the spaces by zigzagging around the tubes (1) and from one layer to the next.

5. The accumulator according to claim 1, characterized in that the primary static liquid (3) contained in each tube (1) is either water, or water dosed with NaCl salts, or another eutectic solution.

6. The accumulator according to claim 1, characterized in that the wall (2) of each tube (1) is metallic.

7. The accumulator according to claim 1, characterized in that the isothermal enclosure (10) is closed in such a way that the used secondary refrigeration fluid (11) can be a gas.

8. A method for accumulating a refrigeration capacity and rendering said refrigeration capacity using the accumulator according to claim 1, characterized in that it is comprised of circulating a secondary refrigeration fluid (11) between the horizontally disposed tubes (1), outside the latter, in order to cool the primary static liquid (3) contained in each tube and/or of circulating a secondary, so-called utilization liquid (11) between said horizontally disposed tubes (1), outside the latter, in order to cool said secondary utilization liquid under the effect of the primary static liquid.

9. The method according to claim 8, characterized in that the circulation between the tubes (1) of the secondary refrigeration fluid (11) and/or of the secondary utilization liquid (11) takes place at right angles to the general direction in which said tubes run.

10. The method according to claim 8, characterized in that the secondary refrigeration fluid (11) and the secondary utilization liquid (11) circulating between the tubes (1) represent one and the same fluid and in that a distributor (20) regulates the circulation of this single fluid in the "charge" mode, in the "discharge" mode, or in the "mixed" mode.

11. An accumulation tube (1) enclosing a primary static liquid (3) capable of transforming into ice under the effect of a secondary refrigeration fluid (11) circulating around said tube, and/or of cooling a secondary, so-called utilization liquid (11) circulating around said tube, said tube being intended to equip a refrigeration capacity accumulator according to claim 1 and being characterized in that it is metallic, in that it is closed at each of its two ends (4, 5) by an internally concave wall, and in that it leaves an expansion space (1a) open between the primary liquid (3) and its cylindrical wall (2).

12. The accumulation tube (1) according to claim 11, characterized in that it has a diameter of about 10 centimeters and a length on the order of 1 to 6 meters.

13. The accumulation tube (1) according to claim 12, characterized in that its length/diameter ratio is at least equal to 10.

14. The accumulation tube (1) according to claim 11, characterized in that each of its two closing ends has a hemispherical shape.

* * * * *